United States Patent [19]
Sandrew

[11] Patent Number: 5,534,915
[45] Date of Patent: Jul. 9, 1996

[54] METHOD OF COLOR ENHANCING A MONOCHROME IMAGE USING MULTIPLE BASE COLORS FOR SELECTED REGIONS OF THE MONOCHROME IMAGE

[75] Inventor: Barry B. Sandrew, Encinitas, Calif.

[73] Assignee: American Film Technologies, Inc., San Diego, Calif.

[21] Appl. No.: 954,009

[22] Filed: Sep. 30, 1992

[51] Int. Cl.⁶ .................................................. H04N 9/43
[52] U.S. Cl. ............................................. 348/29; 348/34
[58] Field of Search ........................ 358/22, 79, 80, 358/518, 520, 523; 348/29, 30, 34, 576, 577, 645, 646, 647, 648, 649, 650, 651, 652, 653, 654; A04N 9/43, 9/74

[56] References Cited

U.S. PATENT DOCUMENTS

| | | | |
|---|---|---|---|
| 3,761,607 | 9/1973 | Hanseman | 348/34 |
| 4,149,185 | 4/1979 | Weinger | 348/34 |
| 4,189,743 | 2/1980 | Schure et al. | 348/577 |
| 4,794,382 | 12/1988 | Lai et al. | 348/651 |
| 4,984,072 | 1/1991 | Sandrew | 358/81 |

FOREIGN PATENT DOCUMENTS 63-0080692  4/1988  Japan .................. H04N 9/740

*Primary Examiner*—David E. Harvey
*Attorney, Agent, or Firm*—Ratner & Prestia

[57] ABSTRACT

A method for color enhancing an image comprised of a plurality of pixels representing gray-scale values by selecting a region of the image for which color is to be applied. Next, at least two base colors are selected which will divide the color attributes of the region into at least two sub-regions. The particular pixels to which each base color will pertain is designated. Finally, the color information is applied to the region to produce a color image.

13 Claims, 9 Drawing Sheets

METHOD OF COLOR ENHANCING A MONOCHROME IMAGE USING MULTIPLE BASE COLORS FOR SELECTED REGIONS OF THE MONOCHROME IMAGE

FIELD OF THE INVENTION

The present invention relates to color enhancing monochrome images using a color transfer function to relate selected hue luminance and saturation values to the gray-scale information of each pixel of the image.

BACKGROUND OF THE INVENTION

A system and method for color image enhancement is disclosed in U.S. Pat. No. 4,984,072 issued Jan. 8, 1991 and U.S. Pat. No. 5,093,717 issued Mar. 3, 1992, both of which are incorporated herein by reference. In these patents, a system and method is described for color enhancing monochrome images by way of a color transfer function which converts gray-scale information in a monochrome image to unique values of hue luminance and saturation. A motion picture is divided into frames from which certain key frames are selected. Each key frame contains objects, scenery, characters, etc. which are representative of those in the subsequent several frames. Accordingly, by selecting colors for different regions of a key frame, a color legend or template is established from which the subsequent frames can be colored, until a new key frame is reached. In practical terms, a key frame may represent a particular scene and thus will serve as a key frame until the next scene (possibly shot in a different location) takes place.

A key frame is colored by designating regions of the key frame which have a similar hue. For instance, flesh tones of the characters may constitute one region while certain pieces of clothing another region. Certain pieces of scenery such as a house or woods may constitute other regions. It may also turn out that seemingly unrelated parts of the key frame may have similar hues and thus be included in the same region.

Each region is selected using various tools which aid the key frame colorist. A free hand tool allows the key frame colorist to trace the edges of an area to define that area as a region. Another drawing tool allows the colorist to define polygons rather than freehand traced shapes. Still another tool allows the key frame colorist to select certain threshold values and then designate whether gray-scale values which are numerically above or below the threshold value are included in a region.

Once the regions are selected, it is time to select the actual colors which are to be used in the color transfer function for applying colors to the pixels in each region. Colors are defined using the Hue, Luminance, Saturation (HLS) System.

There is shown in FIG. 3 a diagram of the double cone representation of the visible HLS space 40. The actual HLS space is cylindrical. The volume outside of the double conic space, however, is either all white or all black, depending on which half of the cylinder you are in. For this reason, the double conic space is the only space of real concern. In this diagram, a point A is also shown. Point A consists of three components:

a hue value which is the angular displacement α;

a saturation value which is the distance D measured from the central axis of the double conic space; and a luminance value which is measured against luminance axis 48.

Luminance axis 48 shows values from 0 to 255 corresponding to a 256 values (or 8-bit) representation.

These three HLS values which designate point A, undergo an HLS to RGB conversion in block 42 yielding a specific RGB value 46 stored in RGB value look up table 44. Look up table 44 also contains 256 values numbered 0 to 255. In the context of coloring a monochrome image, each RGB value in look up table 44 corresponds to a gray-scale value between 0 and 255 (or an 8-bit gray-scale value word). Accordingly, each region has its own look up table and each pixel gray-scale value in a particular region has an associated RGB value which is used in the final color image.

Colors are selected using a color wheel displayed on a video screen with a pointing device and/or a keyboard input. The color wheel displays a full spectrum of colors, with the actual number of colors being displayed being limited by the video capabilities of the equipment being used. The color wheel is a cross-sectional slice through the double conic space which defines the hue, luminance and saturation (HLS) color representation system. Once colors have been selected for each region, the three information files (pixel gray-scale information, region information and color information) can be used by a color transfer function to create a color image representative of the original gray-scale (monochrome) image.

In frames subsequent to the key frame, it is only necessary to select a region which has an assigned color look up previously selected during key frame coloring. This takes place until the next key frame at which time, the next key frame serves as the template or legend for the assignment of colors to particular regions. Because motion from frame to frame is typically not drastic or sudden, the entire region templates can be moved from frame to frame with only minor touch-up work necessary to sufficiently designate a region.

SUMMARY OF THE INVENTION

The present invention comprises a method of color enhancing an image which is composed of a plurality of pixels having associated gray-scale values. First, a region of an image is selected for application of color. Next, a base color is selected for application to the pixels included in the selected region. Then, at least one other additional base color is selected. This additional base color is also for application of colors to pixels in the selected region. The gray-scale values of the pixels in the selected region are then designated as corresponding to one of the selected base colors. Once this is complete, the respective base colors are applied to the corresponding pixels to form a new color image (or color enhanced image). By having more than one base color, the colorist has more color information to work with in each region and can produce more realistic and/or elaborate color images.

BRIEF DESCRIPTION OF THE FIGURES

The invention will now be described by way of non-limiting example, with reference to the attached drawings in which.

DETAILED DESCRIPTION

Figure 1:
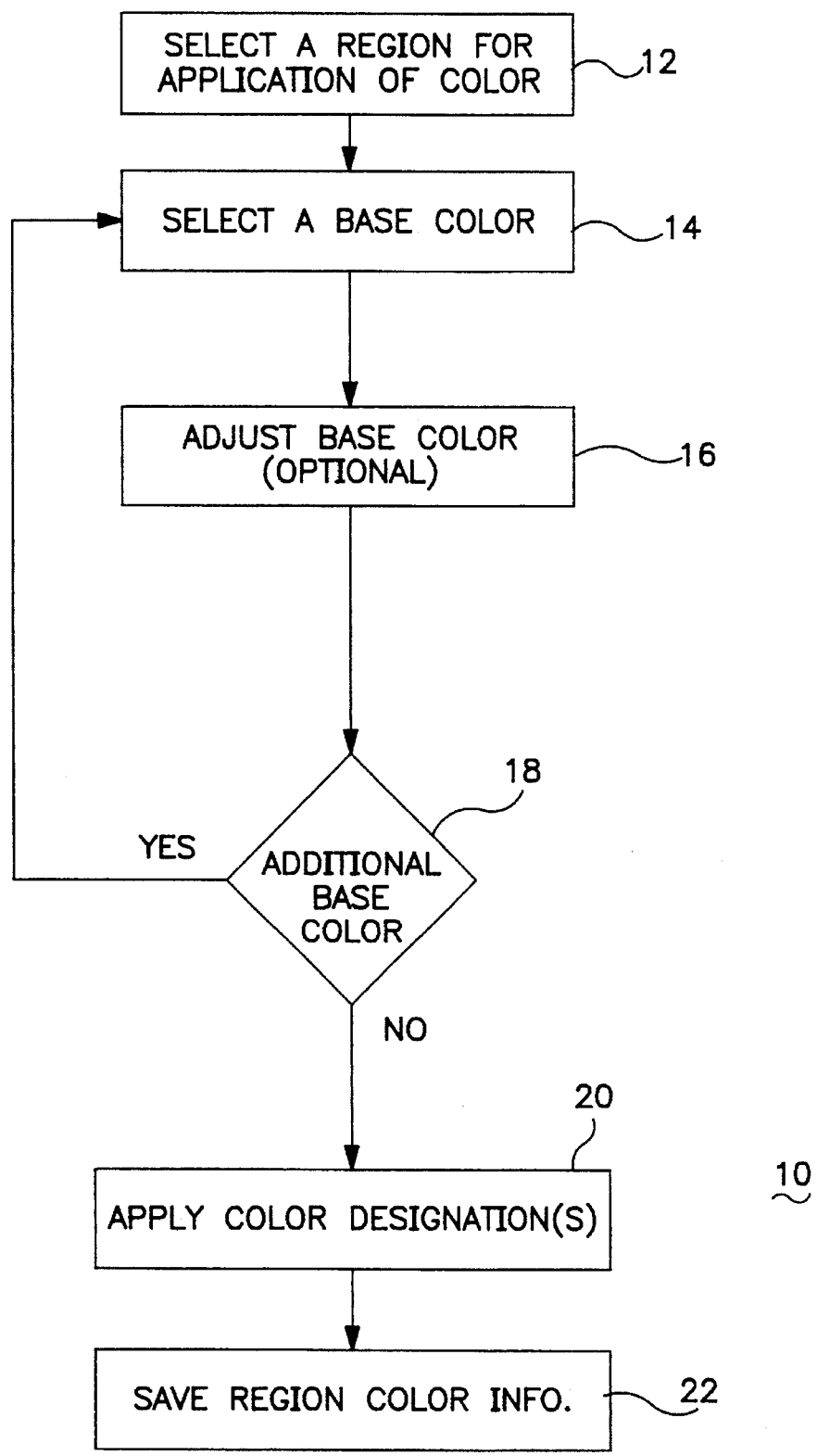
FIG. 1 is an exemplary flow chart illustrating the method of the present invention.

There is shown in FIG. 1 a flow chart illustrating the method of the present invention. In block 12, a region is selected for application of color. This is similar to the selection of a region as described in U.S. Pat. Nos. 4,984,072 and 5,093,717 which have been incorporated by reference. Once a region is selected, a base color is selected. The selection of the base color is similar to the selection of hue and saturation values for a given luminance value. The base colors of the present invention can be thought of as sub-regions. In these sub-regions, pixel gray-scale values of the selected region are subdivided to fall within a range of pixel gray-scale values assigned to each sub-region. Each sub-region will be assigned its own color values (RGB values) in the look up table of the region. The assigned pixel gray-scale values correspond to the entries stored in the memory locations comprising the look up table. The look up table information constitutes the color information used with picture gray-scale information and region information to produce a color image.

Next, in block 16, the base color may be optionally adjusted or fine tuned to achieve the exact color desired. Adjusting the base color may be necessary to achieve a range of colors as close to the desired color as possible. Visually, this can be thought of as picking the "right red" from the multitude of possible shades of red. Block 16 is described more fully by reference to FIGS. 2, 8 and 9, below.

In decision block 18, it is determined whether additional base colors are to be selected to achieve the "multibending" effect in a particular region. Multibending allows multiple colors (or variations) in colors which are otherwise not possible by the selection of one color (or two colors in this case of singly "bent" colors). In these cases, the dynamic range of a color was limited by the number of look up table entries on either side of the selected color. Assuming an 8-bit word (=256 entries) and the selected color at the midpoint (128), there are only 127 and 128 respective entries in the look up table variations or on either side of the selected color. Sliding the scale in either direction still only leaves a maximum range of 255 entries. This is not sufficient to go from a red to a blue, for example without multiple base colors or multibending in one region. The multibending effect is the desired result of the method of the present invention.

The number of base colors which can be selected is limited by the number of gray-scale values which can be associated with any particular pixel. In the present embodiment, an 8-bit word describes the gray-scale value for any particular pixel. Accordingly, there can be a total of 256 base colors selected for a given region. This is not a limitation of the present invention, but merely a design choice in the present embodiment. Those skilled in the art will understand that a pixel gray-scale value of greater than 8 bits will yield the possibility of more base colors which can be selected. Conversely, a gray-scale value which is less than 8 bits will yield the possibility of fewer base colors which can be selected. Once the desired number of base colors have been selected, the color designations of each base color are applied in block 20. The base colors are applied to their corresponding pixels in the region being worked on. Applying the base colors first involves constructing the look up table of entries for the region which takes into account all of the base colors which have been selected. The creation of the look up table is described in more detail below with respect to FIG. 8. Finally, in block 22 the region color information is saved.

Figure 2:
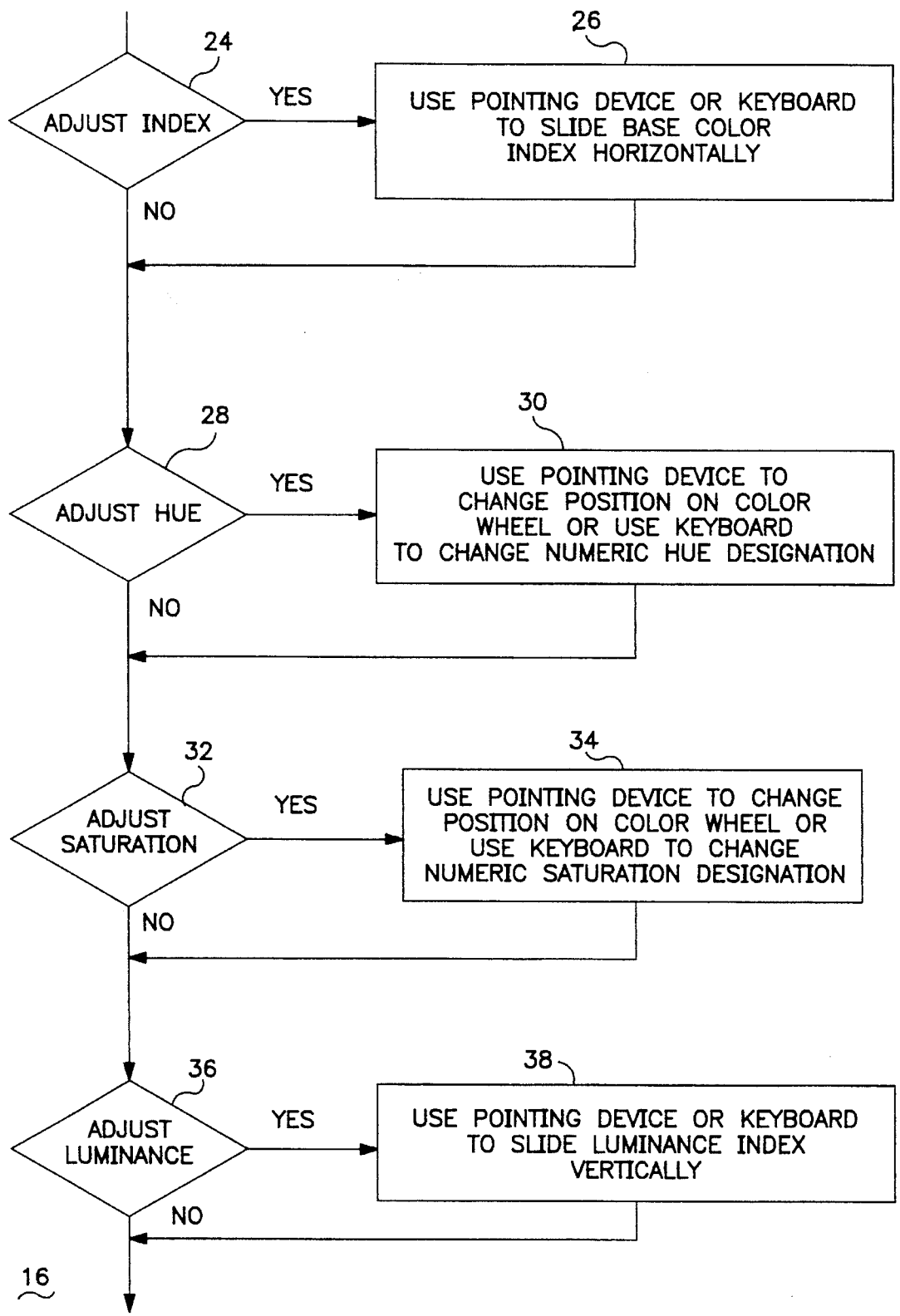
FIG. 2 is an exemplary flow chart of a step illustrated in FIG. 1.

There is shown in FIG. 2, several ways which the base color adjustment of block 16 (FIG. 1) can be effectuated. In decision block 24, it is determined whether the index of the base color is desired to be adjusted. If so, a pointing device or the keyboard can be used in block 26 to slide the base color index along the horizontal axis. The use of the horizontal and vertical axes is merely a design choice of the present invention and it is not limiting. Sliding the base color along the horizontal axis in the exemplary embodiment increases or decreases the number of pixel gray-scale values which fall within this base color sub-region.

In block 28, the decision is made whether to adjust the hue value. If so, a pointing device may be used on a color wheel to select a new hue value. It is also possible to enter a new hue value numerically using the keyboard.

In block 32, it is decided whether to adjust the saturation. Like adjusting the hue, in block 34, either a pointing device or a keyboard entry will change the saturation value. In block 36, it is decided whether to adjust the luminance value. This may be done in block 38 with a pointing device or a keyboard to slide the luminance index vertically. Like the base color index, the luminance index is not limited to the vertical axis, but is merely organized this way in the present embodiment.

Figure 8:
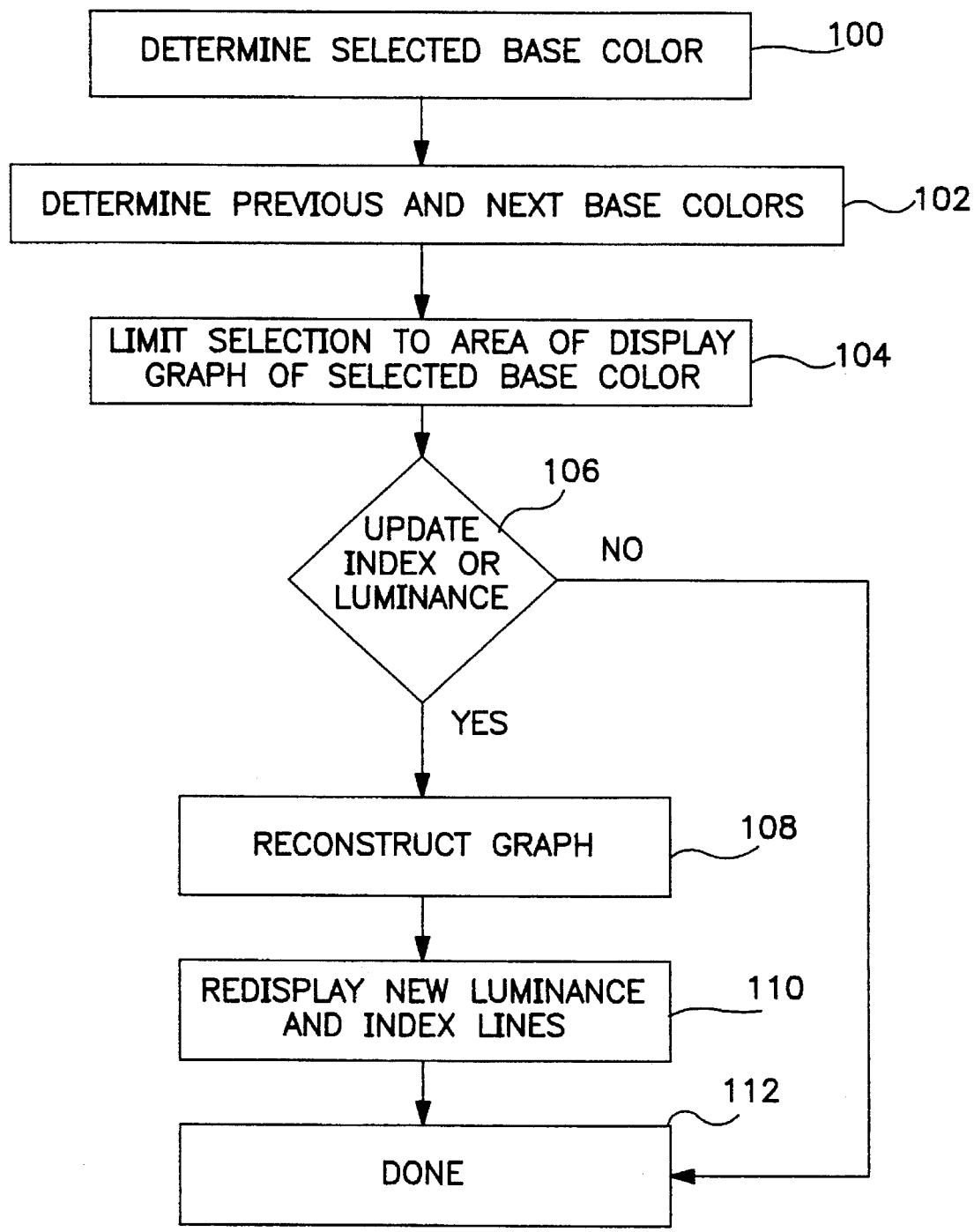
FIG. 8 is an exemplary flow chart showing the process for adjusting/setting the luminance or base color index.

There is shown in FIG. 8 a flow chart showing an exemplary process for adjusting an already selected base color or selecting a base color. In block 100 the selected base color is determined. Next, in block 102, the previous and next base colors sequentially in the selected region are determined. This effectively designates the location in the look up table where entries will be stored for the selected base color. In terms of the monochrome image being color enhanced, this area corresponds to a range of gray-scale values in the selected region.

The area of the display graph (see FIGS. 5 and 6) is limited to the selected area in block 104. This assures that the adjustments or selections only take place with respect to the selected base color. In decision block 106 it is determined whether to update the base color index or the luminance scale of a base color. The base color index is essentially the selected base color. It is referred to as an index for purposes of its graphic display (as set forth in more detail with respect to FIGS. 5 and 6). Both the base color index and the base color luminance are typically adjusted or selected using a mouse on the graphic display. The operation of the tool for adjusting or selecting the base color index and luminance is very similar, with one operating on the horizontal axis to slide the base color index, while the other operates on the vertical index to slide the base color luminance. If either the base color index or luminance are updated, the graph of base colors is reconstructed in block 108. The new luminance and index lines are displayed in block 110 and the routine is complete in block 112. For purposes of illustration, the luminance and base color index routines were illustrated as one flow chart in FIG. 8. Those skilled in the art will understand that the actual routines may not be included in one subroutine.

Figure 9:
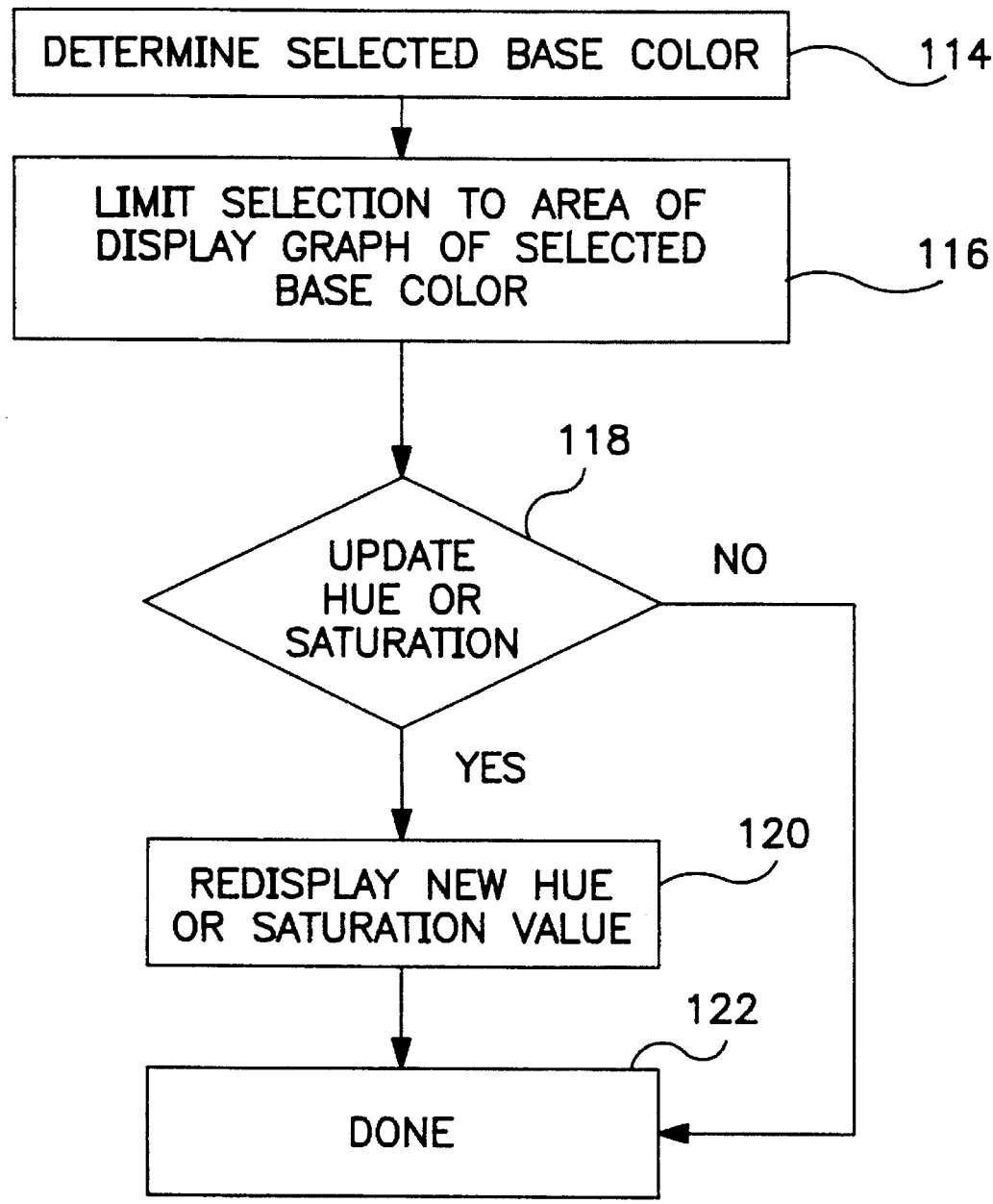
FIG. 9 is an exemplary flow chart showing the process for adjusting/setting the hue or saturation values.

There is shown in FIG. 9 a flow chart of the exemplary process for adjusting or selecting the hue or saturation values. Like the flow chart shown in FIG. 8, the hue and saturation selection/adjustment is shown by way of example as one flow chart.

In block 114, a selected base color is determined. In block 116, the area of the display graph of the selected base color is limited so that the hue and saturation adjustments effect only the selected base color. In decision block 118, either the hue or saturation values are updated. As previously mentioned, hue and saturation values can be updated either using the color wheel or direct keyboard entries of actual hue or saturation values. If the hue or saturation values have been updated, the new hue and saturation values are redisplayed in block 120. The process is complete in block 122.

Figure 10:
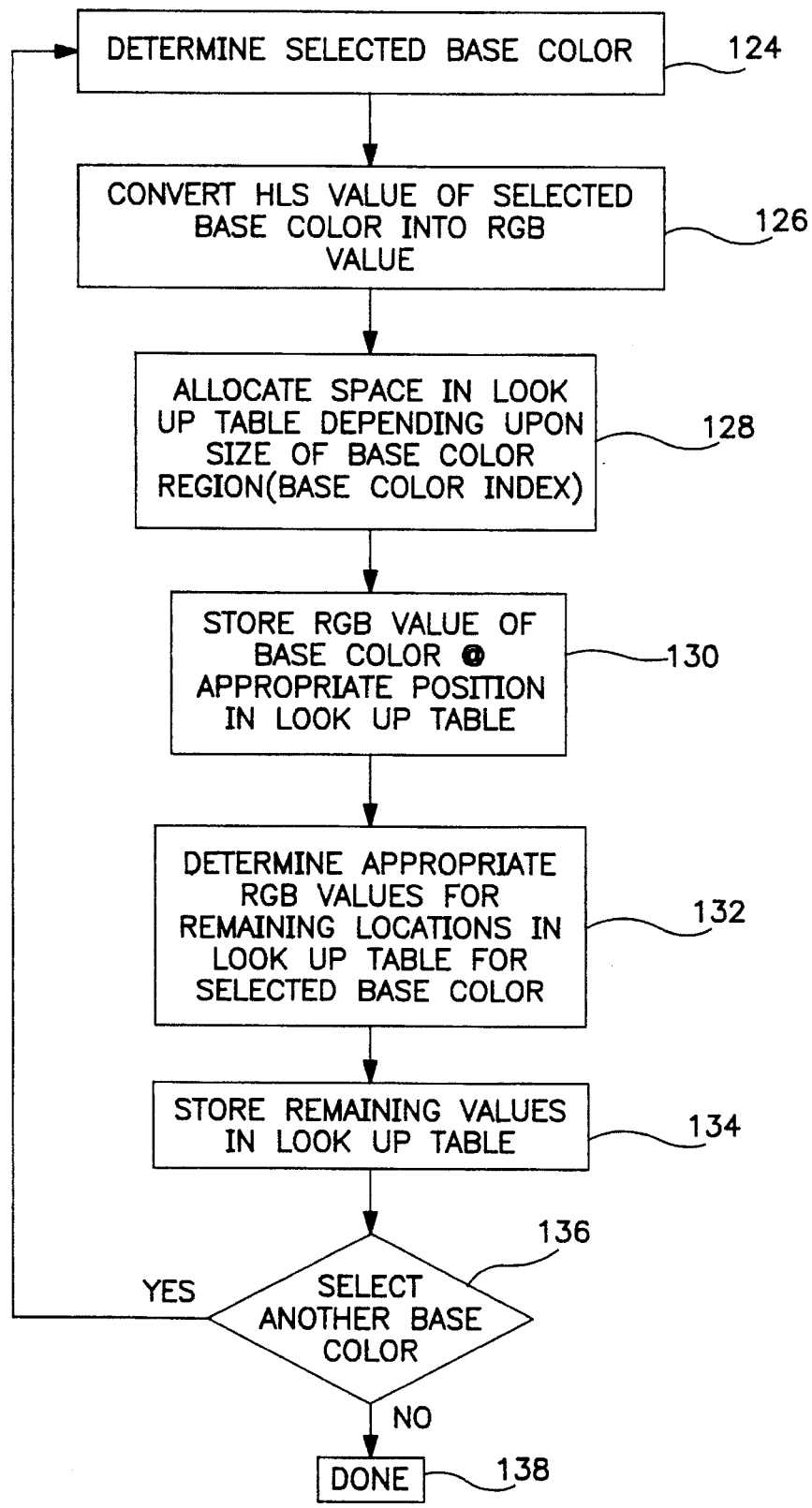
FIG. 10 is an exemplary flow chart showing the process of creating a look up table having multiple indices.

There is shown in FIG. 10 a flow chart of an exemplary process for creating a look up table of multiple base colors. In block 124 a selected base color is determined. The HLS value of the selected base color is converted into an RGB value in block 126.

Space is allocated in look up table for the selected base color in block 128. Because each selected base color reduces the possible number of look up table entries for any particular region, it is necessary to subdivide the look up table for each base color which is selected.

The converted RGB value of the base color is stored in the look up table at the appropriate position in block 130. Typically, the base color is the mid-entry in the space allocated for a particular base color. For example, if the space allocated for a particular base color is 128 locations in the look up table, the base color would be somewhere around location 63, 64 or 65. This is not a requirement of the present method, but merely a typical application. It is possible for a base color to be stored at an extreme of a base color sub-region in the look up table.

Next, in block 132, the appropriate RGB values for the remaining locations in the look up table for the selected base color are determined. This is determined by way of a predetermined indexing of remaining values in the look up table. The predetermined index can be of any increment as desired. This effects the "dynamic range" of the base color sub-region.

In block 134, the remaining RGB values are stored in the look up table for the base color. In block 136, it is determined if another base color is selected. If yes, the process from blocks 124 through 134 is repeated. If no, the routine is complete.

As each of the adjustments are made, the corresponding color change may also be displayed simultaneously. This will allow the colorist to see the effect of the adjustments. It is also possible to use fewer monitors and to not show the adjustments or color selections in real time. In such an embodiment, the selection would be made and then a color monitor would be switched either approximately to the color selection or at a later time to see the results of the color selection.

Other embodiments show the colors on screen as they are selected, while not being shown in a particular region of the image.

Figure 4:
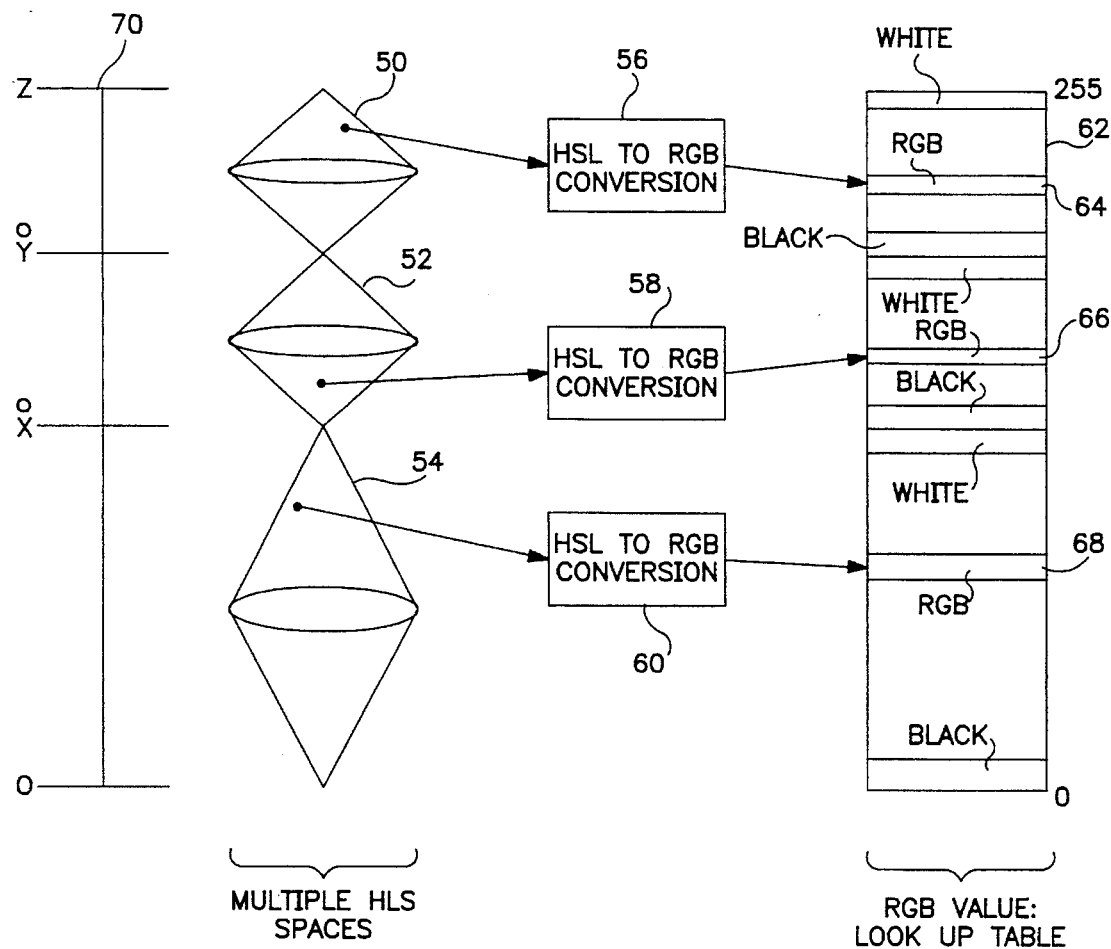
FIG. 4 is a graphic illustration of the operation of the method of the present invention.

There is shown in FIG. 4 a diagrammatic illustration of the effect of the multibending method of the present invention. FIG. 4 consists of three double conic spaces 50, 52 and 54. Each of these double conic spaces represents an HLS space around the respective base color. For purposes of the example shown in FIG. 4, the HLS space has been divided into three separate double conic spaces. In this case, a first base color would be selected, a second base color would be selected and then a third base color would be selected. It is possible to have up to 256 base colors and thus 256 double conic spaces (of one pixel gray-scale value) selected in the present example, because there are 256 possible gray-scale values. Obviously, a double conic space of one pixel gray-scale value would not function or appear as a double conic space.

Figure 3:
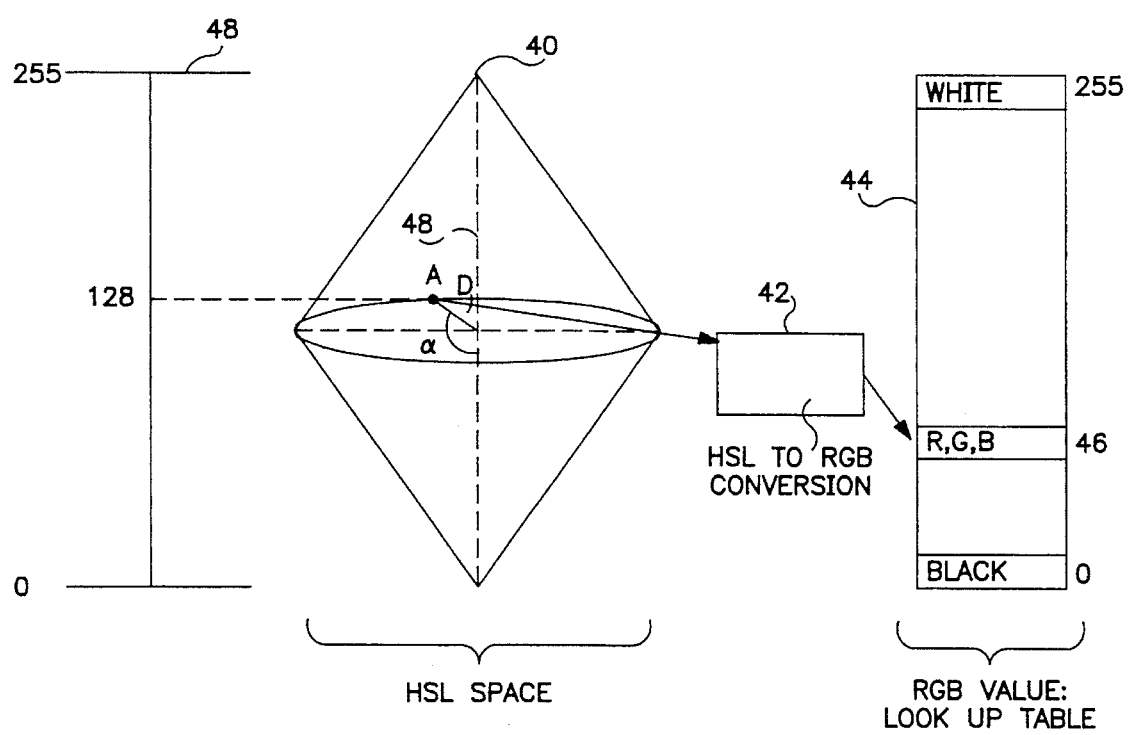
FIG. 3 is a diagram illustrating the conversion of a point in the HLS space to an RGB value through the color transfer function of the present invention.

FIG. 4 is a multiple application of the double conic space shown in FIG. 3. In FIG. 4, each double conic space 50, 52 and 54 has its own corresponding HLS to RGB conversion block 56, 58 and 60 respectively. Each converted HLS to RGB value is in stored in the RGB value look up table 62. Essentially, the 256 bit space of look up table 62 is divided into three sub-regions corresponding to double conic space 50, 52 and 54. In this way, a region can be divided into several sub-regions. Each sub-region in turn contains a base color (in the HLS coordinate system) which may or may not have any relation to the other base colors selected.

The three double conic spaces shown in FIG. 4 show the point (or apex) of each cone intersecting with that of another cone. It is possible that the apex of the cones "sit" inside of another cone, combining the upper, lower or both segments of the double conic spaces.

For some examples, it would be desirable to have related base colors to achieve certain effects. For example, the flesh tone may have several hues as a result of reflections from the sun, moon, fires, etc. In these circumstances, flesh tones may range from the pale to very red or orange. By allowing the selection of multiple hues, the colorist is able to achieve a more realistic look. Other types of reflections will also benefit from this ability to multibend or add multiple sub-regions to a selected region. As can be seen in FIG. 4, the RGB value look up table 62 has a fixed number of entries depending upon the number of bits used. This fixed number of entries can be subdivided into as many sub-regions as there are possible entries (i.e. 256 in the present embodiment). In the present example shown in FIG. 4, there are three sub-regions of differing sizes. The sub-regions are bounded by the entries black and white in the example shown. The boundaries of "black" and "white" are also optional, representing the respective apexes of the cases of the double conic space. The black and white values are merely entries in the look up table. Accordingly, other "colors" could be substituted in (by storing the RGB value of the particular color) at the boundary points of the base colors (sub-regions) for varying effects.

It can thus be seen that each sub-region has fewer than 256 possible RGB values which can be associated with them. The sub-regions shown are approximately ¼, ¼ and ½ of the total 256 bit look up table and thus can contain only 64, 64 and 128 look up values, respectively. This limits the "dynamic range" of the colors being applied in each sub-region as compared to the full 256 entry dynamic range of the entire region in the present example. This is taken into account by the colorist in assigning colors. If the full dynamic range of 256 look up table values (for the present example) are required, then a region should not be further subdivided. Instead, other regions could be selected and multiple base colors selected therein. In many cases, however, all 256 possible look up table values are not used. In these cases, assuming it is desirable to subdivide a region into sub-regions, there is no practical effect on the "dynamic range" of the applied color in the region.

Figure 5:
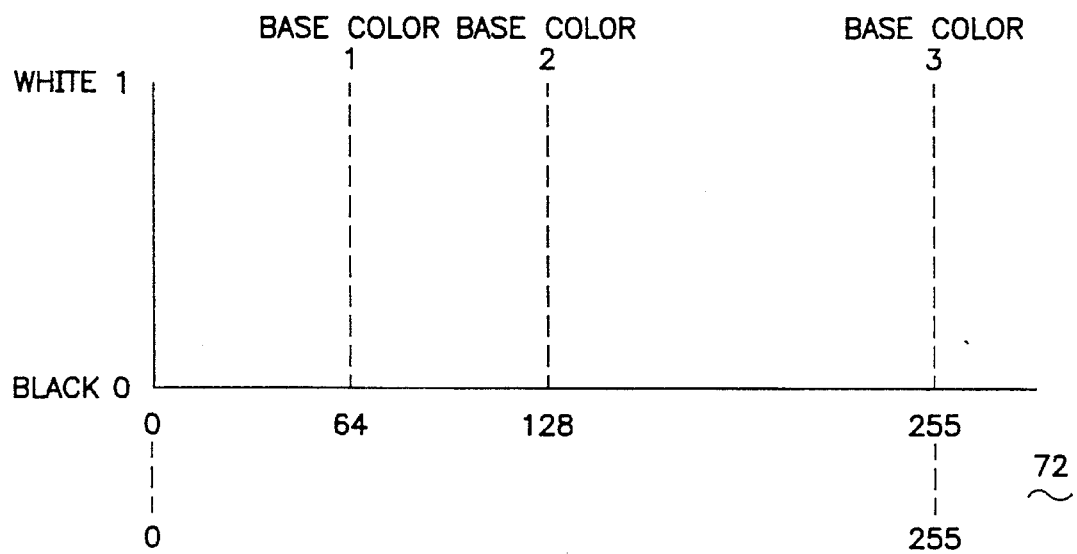
FIG. 5 is an example of a screen display using the method of the present invention.

There is shown in FIG. 5 an example graphical display 72. Graphic display 72 could be displayed on a computer monitor to show the base colors and their relationship to each other. It is also possible that the monitor displaying graph 72 would display the hue and saturation values for each base color as well as a color bar underneath the horizontal axis of graph 72 showing the actual colors throughout the dynamic range of each sub-region.

Figure 6:
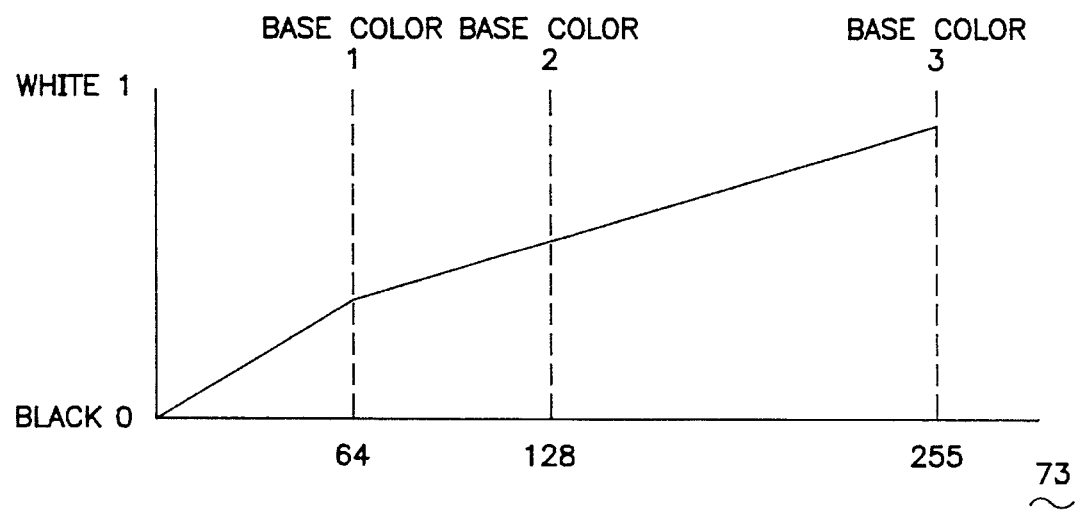
FIG. 6 is another example of a screen display.

FIG. 6 shows a graph 73 with color ramps shown through each sub-region. It can be seen in graph 73 how color is "bent" through each base color. Each base color has its own look up table corresponding to the line segments through each base color sub-region.

Figure 7:
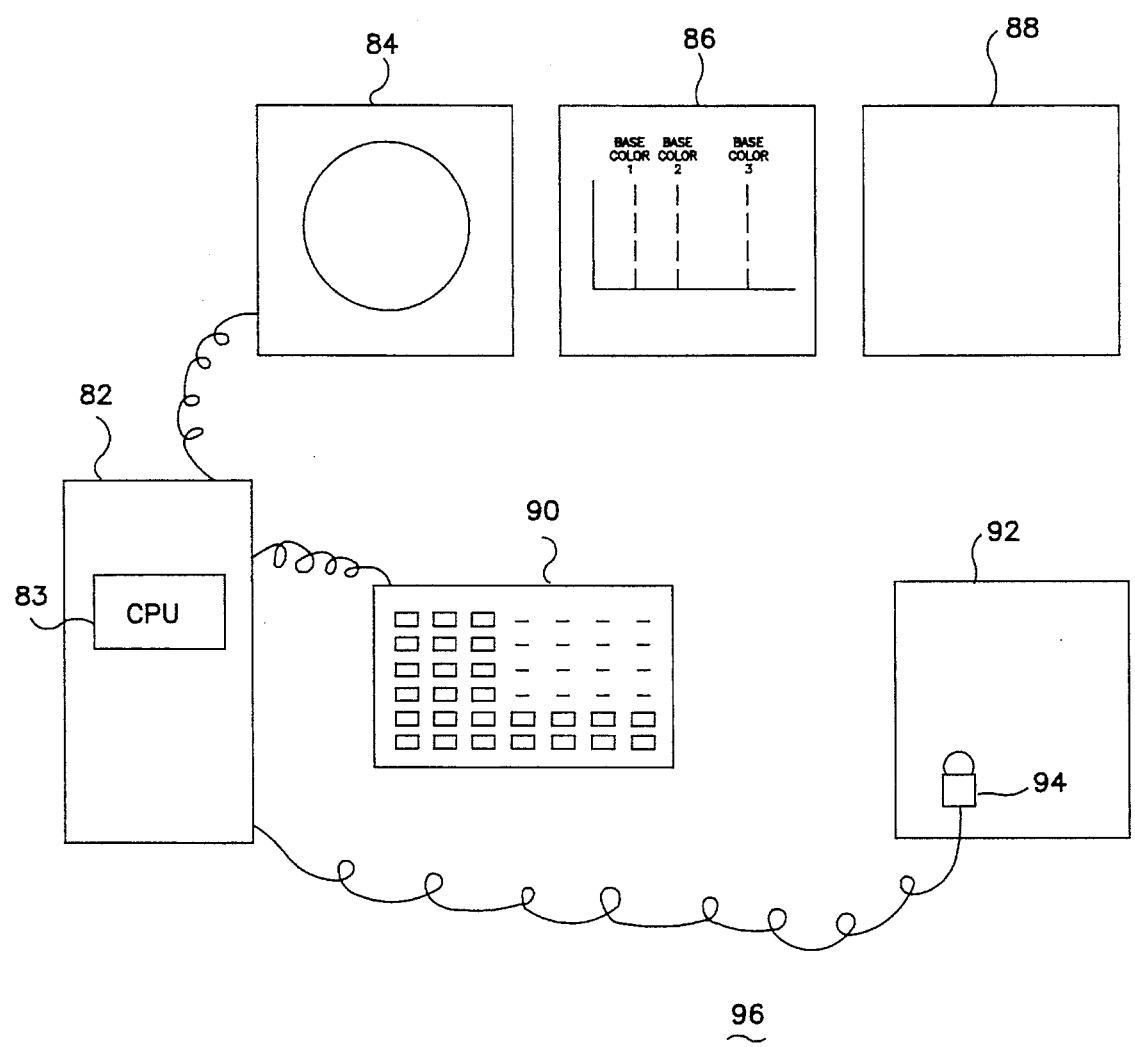
FIG. 7 is an example workstation setup for implementing the method of the present invention.

There is shown in FIG. 7 an exemplary display setup of a design station 96 for applying the multibending method of the present invention. A computer unit 82 contains pipeline architecture image processing hardware with a central processing unit and related hardware 83, which operates on the memory structures used in coloring monochrome images (as described more fully in U.S. Pat. Nos. 4,984,072 and 5,093,717 incorporated by reference herein). In the present example, the image memory is 16 bits deep, although only 12 bits are currently used (8 bit gray-scale value and 4 bit region information), and is organized as a two-dimensional rectangular array. The more bits used increases the number of regions which can be used. The horizontal dimension of the memory is 2K words, and may be expanded or decreased as understood by those skilled in the art. The upper and lower bytes of the memory can be addressed separately, so that two different 8-bit blocks of image information can occupy the same area of memory simultaneously. Image memory is controlled through a group of registers that physically reside on an image memory interface board. The registers are accessible through I/O ports. The five registers consist of control and status registers. Generally, the control register selects a mode of operation for a transfer of image data, and the address registers control the address where the data is placed. Connected to CPU 82 can be multiple displays 84, 86 and 88 such as EGA or VGA computer monitors. Display 84 shows a color wheel. Display 86 shows a graph of the multibending sub-regions. Display 88 can be used to show the region information and/or the actual application of color to particular pixels. A keyboard 90, pointing device 94 and graphics (digitizing) tablet 92 (such as a Sumagraphics™ tablet) are used for inputting information as well as selecting particular parts of the images on screen.

What is claimed:

1. A method of color enhancing an image comprised of a plurality of pixels representing gray-scale value comprising the steps of:

a) selecting a region of pixels of said image;
    b) selecting a first base color for applying to said pixels of said region of said image;
    c) displaying a representation of said first base color at a first index value on a display graph having an axis defined by a plurality of base color index values corresponding to an allowable number of base colors;
    d) selecting at least one additional base color
    e) displaying a representation of said at least one additional base color on said display graph at a second index value in association with said first base color;
    f) designating which of said pixel gray-scale values correspond to said first base color;
    g) designating which of said pixels correspond to said at least one additional base color; and
    h) applying said first base color and said at least one additional base color to corresponding pixels of said selected region, using a color transfer function comprising a look-up table.

2. The method of claim 1 further comprising the step of displaying said base colors as a computer displayed graph.

3. The method of claim 1 further comprising the step of:

a) selecting an index value for said base color by designating a point on said display graph with a pointing device.

4. The method of claim 3 further comprising the step of adjusting said pixels to which said base color corresponds by moving said point corresponding to said base color to a new index value on said graph with a pointing device or keyboard.

5. The method of claim 1 wherein said steps of selecting said at least one additional base color is comprised of:

a) selecting a hue value;
    b) selecting a saturation value;
    c) selecting a luminance value; and
    d) applying said hue, saturation and luminance values to said display of said representation of said at least one additional base color on said display graph.

6. The method of claim 4 wherein different hue and saturation values are selected for each of said base colors.

7. A system for color enhancing an image comprised of a plurality of pixels representing gray-scale value comprising:

a) means for selecting a region of pixels of said region;
    b) means for selecting a first base color for applying to said pixels of said region of said image;
    c) means for displaying a representation of said first base color;
    means for selecting at least one additional base color;
    e) means for displaying a representation of said at least one additional base color in association with said first base color;
    f) means for designating which of said pixel gray-scale values correspond to said first base color;
    g) means for designating which of said pixels correspond to said at least one additional base color;
    h) means for applying said first base color and at least one additional base color to corresponding pixels of said selected region using a color transfer function comprising a look-up table.

8. The system of claim 7 wherein said means for displaying a representation of said first base color and said means for displaying a representation of said at least one additional base color in association with said first base color comprise a display graph having an axis defined as a base color index corresponding to an allowable number of base colors.

9. The system of claim 8 wherein said display graph further includes an additional axis defined as a luminance value scale representative of luminance values associated with each base color.

10. The system of claim 8 wherein said display graph is interfaced with a pointing device.

11. The system of claim 10 wherein said first base color and said at least one additional base color are located on said display graph by selecting respective points on said display graph for said first base color and said at least one additional base color with said pointing device.

12. The system of claim 8 wherein said first base color and said at least one additional base color colors are selected from a color wheel.

13. The system of claim 10 wherein said first base color and said at least one additional base color are movable along said base color index.

* * * * *